Patented May 15, 1951

2,553,412

UNITED STATES PATENT OFFICE 2,553,412

MOLDING FIBER COMPOSITION

Clark C. Heritage, Cloquet, Minn., assignor to Wood Conversion Company, St. Paul, Minn., a corporation of Delaware No Drawing. Original application August 28, 1942, Serial No. 456,559. Divided and this application December 13, 1943, Serial No. 514,107

4 Claims. (Cl. 92—3)

The present invention relates generally to molding compositions, and in particular to a feltable wood fiber associated with a suitable binder such as a molding synthetic resin, providing a feltable moldable fiber composition in loose or bulk form, or in felted-fiber form.

Wood is a valuable source of fibrous material; synthetic resins are a valuable non-fibrous material. Heretofore, wood substance in substantially non-fibrous or non-feltable form, has been combined in the form of wood flour or sawdust with various thermo-setting synthetic resins to make various solid products. Wood has a component which becomes plastic with heat. Also fibers derived from wood by processes removing part of the wood substance including some or all of the plastic content, have been variously associated with synthetic resins for molding operations.

It is the object of the present invention to retain all the substance of wood, and to provide it in a feltable fibrous form for felting operations to build bound and felted fiber structures involving a binder material as a fiber-to-fiber bond or as body matrix for fibers in the resulting product.

Heretofore, paper, cardboard and pulps for forming such have been mixed mechanically with synthetic resin and more or less water to provide masses or slurries of fiber and resin, and more particularly slurries for wet felting of the fibers for subsequent binding of the fibers by resin.

In the preparation of such fibers from wood, processes are used which remove woody material as an incident to securing fibers. The removed material is the encrusting substance and cementitious material associated with fibers including plastic content, whereby the ultimate fibers of cellulose become more exposed. These are more absorptive of resin, especially in the steps where it fuses or liquefies in final or setting reaction. The result is a less efficient use of resin for bonding or matrix functioning.

In accordance with the present invention wood is reduced to substantially ultimate fiber form without exposing the ultimate cellulose, by reason of the fact that the encrusting and cementitious material is retained in its original association with the fiber part of the wood. This is done with a minimum of cutting, breaking or powdering of the wood, in order to avoid a wood form in the nature of flour or sawdust, whereby fibers predominate for the desired subsequent uses.

It is known in the Asplund U. S. Patent No. 2,008,892 that wood may be defibered mechanically to said ultimate cellulose fibers with ease and with a minimum of mechanical powdering, cutting or comminuting and in a very short time, as for example about one minute, when it is heated in the presence of a form of water at temperatures considerably elevated above 212° F., at which the plastic constituent, so-called lignin, in the wood is softened. The temperature at which this is best effected varies with various woods, and in the case of aspen is about 350° F. and in the case of jackpine, about 365° F. Although said Patent No. 2,008,892 states that there is substantially no chemical change occurring in the process, it is known that this statement does not apply to the non-cellulose constituents such as lignin and polysaccharides, of which small amounts are rendered soluble.

In carrying out this process wood chips are charged into a suitable machine having steam under pressure, as described in said Asplund patent, and a loose bulk moist fiber is discharged, free from suspending water.

Such fiber is excellent for felting operations not employing water, as for example by deposition processes to build mats, or penumatic moving and depositing processes to build mats and other forms. The latter may be more or less complicated, as described in Heritage U. S. Ser. No. 294,212, filed September 9, 1939, of which continuation-in-part applications have now issued as Patents No. 2,439,601 through No. 2,439,604.

Such felt-forming processes are advantageous for fiber produced by said Asplund process, because all the water-soluble content of the fibers is preserved. This includes that of the natural wood, and more which is formed in the process of defibering, as an incident to the minimum time of defibering. In about one minute, approximately 4% of the wood substance is rendered water-soluble as an addition to the natural water-soluble content. Where more water-soluble content may be desired, the time may be prolonged, or the wood or the fiber heated specially in high pressure steam.

The water-soluble content, especially the formed water-solubles, contain polysaccharides, and lignin. The saccharides especially become available for reactive union or plasticizing of synthetic resinous material.

The fibers so produced may be mixed by suitable means in the absence of suspending water, with solid or fluid synthetic resin material in quantity desired.

When a large quantity is desired, it is preferred to add the resinous material to the wood substance in the Asplund machine. It has been found that when a small quantity of heat-reactive resin is present in the defibering process, it is largely advanced to a stage where it is not highly useful as a binder in a subsequent thermal treatment. However, when a larger quantity of resin is present in the defibering, only a fraction is rendered less useful for a subsequent thermal treatment. However, this does not indicate that such a small usage is undesired or not recommended.

It has been found that wood so defibered in the presence of a small amount of resin, which thus becomes less useful as reactive resin, is nevertheless advantageous. It acts to seal the fibers against absorption of resin which may be applied to the resulting fiber. Also, the advancement of resin on the fibers in the course of defibering as described seals the fibers against loss of water-soluble content, whereby in such case, hydraulic felting may be practiced. Resin so applied and so sealing is termed herein a blocking agent. However, resin is not the only blocking agent.

Proteins, starch, asphalt and other materials also may be added to the defibering machine to seal off or block the absorbency of the fibers of wood per se, toward bonding or matrix resin afterwards associated with the fibers.

As to whether or not the reactive resin associated with the loose or bulk fibers, is to be a bonding resin, or a matrix resin, the matter of proportion must be considered. When the mass by weight of fiber plus resin, has about 35% of reactive resin which flows in molding, there is a critical change in the nature of a highly compressed reacted fiber-resin product. Up to about 35%, the product is a felted structure, bonded by resin, with voids increasing in degree as the resin content is below 35%. Above 35% resin, the resin is a continuous matrix reinforced by fibers which are less felted as the resin content rises above 35%. Thus, at the critical content, the resin structure is more reinforced by a felted fiber. The strength of the product is dependent both upon kind of fiber and resin, as well as upon proportion. But the appearance of the surface is dependent upon proportion. Below the critical point, a fibrous surface shows, above it, a homogeneous surface of the resin matrix is exhibited. One utility of the bulk fiber associated with resin, is to permit the production of a wide range in kinds of "preforms," as felted fiber structures of lower density than of some desired product to be produced by compression from a preform. Thus, for example, loosely felted mats or blankets, or highly compressed preforms, may be made of the fibers carrying resin. The blanket, or cut portions thereof, or shaped preforms, may be hot molded under pressure between suitable dies to form flat boards, panels, or special shapes, with embossings or designs as desired. These preforms may have more or less than the said critical amount of resin according to the product desired.

It is to be noted that the critical content of 35% resin (54 parts of resin per 100 parts of fiber), was stated as referring to resin which flows on molding. Where resin is advanced as it is associated with fibers prior to the thermal molding, it may be advanced to a degree whereby its flowing property is greatly diminished. For example, phenolaldehyde resin added in large quantity to the wood in the hot defibering process, is to a considerable degree advanced so far that on hot-molding of such fibers, the resin remains closer to the fibers and does not flow to the mold surface. Accordingly, it is possible to make fiber-resin products having the same composition over 35% resin content, and in one case, the surface will be resinous, and in the case of pre-advanced resin, the surface can be fibrous in texture.

Therefore, according to the present invention the wood is mechanically defibered in the absence of suspending water, in the presence of water vapor, and at a temperature assuring softening of the lignin, whereby to produce a mass of bulk moist fibers. Resin may be present during the defibration. The moist or the dry resin-free fibers are then associated with liquid resin, solid resin, or an aqueous emulsion of resin, yet in the absence of any suspending amount of water for the fibers where no resin is used in defibering whereby to provide a bulk mass of feltable fibers, or a felted mass of fibers, dry or moist having all the material of the wood providing the fibers, and bearing resin to bind or to include the fibers upon proper subsequent treatment. The association of resin with the fibers may be effected while the fibers are suspended in air and as they are being carried, or deposited in a felt-forming process.

In the case where advanced resin on fibers is provided to sufficient extent to seal the water-soluble content of the fibers against extraction by water, a water-suspension may be felted into a preform structure.

Bulk fibers, moist or dry, may be baled as a special raw material. Preforms from such fibers may be made, and shipped as blanks for special finishing operations. If desired, the fibers after associating them with resin, as fibers, or as preforms, may be treated to advance the resin to incomplete setting, whereby the processing to the final product may be less extreme. The advancing may take place in the preform, whereby advanced but reactive resin, serves as binder to hold the fibers together in the preform. Advancing prior to final reacting may be practiced to control the structure of the product, as described above.

The invention is not limited to particular types of binders, and involves either natural or synthetic binders or resins, either thermoplastic or thermo-setting. The thermo-setting phenolaldehyde types are preferred. Other thermoplastic thermo-setting or thermo-reactive binders may be employed. Suitable ones are phenol-furfural resin, lignin-furfural-aniline resin, urea-aldehyde resins, drying oils alone or in admixtures including alkyd resins, and the like. Synthetic drying resins, such as Puro-Resin may be used.

The term "thermo-reactive" signifies ability to undergo internal reaction to form a bonding agent under the influence of applied heat.

Thermo-reactive or other binders which in their form after molding are thermoplastic, in some uses of them, may require cooling of the hot molded product in the mold to maintain the predetermined shape.

The term "preform" signifies any body to be subjected to thermal molding. Pressure as high as or higher than that to be used in thermal molding may be employed in producing a preform. Preforms may be made without substantial compression, as by merely felting the fibers into a felted structure.

A structure such as a desk top, comprising a panel top and box-like sides may be formed pneumatically by blowing a mass of resin-carrying fibers into a screen-vented form, roughly to mold a low density shape. This shape may be further compressed between dies to a more dense self-sustaining structure of shape suitable to enter the dies of a heated mold. The heated mold may compress it further, and finally react the resin.

Molding fiber compositions having up to 60% of phenolformaldehyde resin may be molded to make products of varying densities. Densities up to 87 pounds per cu. ft. have been attained. At high densities and at resin contents from about 35% upwardly, the product may be a resinous matrix embodying the fibers. Compared to like wood flour-resin compositions, the fiber-product, has two to three times the impact resistance, because of the fibrous form of the wood constituent. The fiber structure also permits making pre-forms, while flour-resin compositions lack such adaptability.

EXAMPLE 1

Aspen wood is defibered at about 350° F. in about one minute in an atmosphere of steam, providing wood substance in fibrous form. The fiber, either dry or moist, is mechanically mixed with a thermo-setting phenol-aldehyde resin, either in aqueous liquid form as water-soluble resin of about 55% resin solids content, or with a dry powder of a molding form of phenolaldehyde resin. Usages of resin solids at 10, 20, 40 and 60 per cent by weight based on total parts of fiber plus resin, have been effected in suitable mechanical mixers. Water may be present, as by using moist fibers as discharged from the defibering step, or by using an aqueous liquid resin, or by adding water, avoiding an amount of water to suspend the fibers.

Such fibers, moist or dry, are packed into a suitable mold, or felted to a form to fit a mold, are then hot pressed, using a temperature from 150° C. to 180° C., and varying pressures, whereby to secure more or less dense products, weighing 45 lbs., 65 lbs. and 85 lbs. per cu. ft. The amount of water in the fiber mass is best reduced for the higher density product. For a final product of 40 lbs. per cu. ft., density, 40% water (based on dry fiber) may be present. Where the final density is 60 lbs. and 85 lbs. per cu. ft., the preferred maximum water content is respectively 30% and 20% (based on dry fiber). Excess water leads to blistering on removal from the mold, unless the molded product is held unduly long in the mold to boil off the excess of water. The more dense products are better traps to prevent loss of water.

EXAMPLE 2

Jackpine wood is defibered in steam at about 365° F. in about one minute, forming feltable fibers of wood substance. The fibers moist or dry are blown as individual fibers into a chamber wherein they may fall onto a base, preferably a moving conveyor, to build up a felted body of fibers. Liquid synthetic resin compound, such as a solution, or a suspension or emulsion in water, or powdered synthetic resin is injected in fine dispersion into the chamber for mixing with the fibers and depositing therewith. Water is preferably present to form a moist felt. Where the felt so formed is of light density it may be compressed to a self supporting structure.

The mat, moist or dry, provides a suitable preform from which pieces or formed blanks may be made. A piece of this preform is placed in a heated pressure mold and the resin thus thermoset. The moist mat may be dried in an oven at a temperature insufficient to finally react the resin, but sufficient to advance it, thus to utilize it as binder for the preform felt. By air drying the mat, such advancement may be avoided.

The above mentioned jackpine fibers are blown dry into a forming region and a solution of phenol aldehyde resin introduced as a mist into the suspended fibers, in amount of 46 parts of resin to 54 parts of dry fiber. The fibers deposit as a moist felt, which is compressed slightly to 2½ inches thickness. The moist mat is air dried. A section of mat 2¾ inches x 4½ inches is cut from the dry felt and molded at 150° C., and at 3000 lbs. per sq. in. pressure for 9 minutes.

The plate so formed is ⅛ inch thick, has a modulus of impact of 42,900 gm. cm. per sq. cm., a modulus of transverse strength of 16,100 lbs. per sq. in., and a density of 82.2 lbs. per cu. ft.

EXAMPLE 3

Peeled aspen wood defibered at 350° F. in steam in about one minute, is mixed with phenol aldehyde resin solution (55% resin solids) to provide fiber resin masses of 10%, and 50% resin, using as much additional water as of fiber employed for the 10% resin content, and one and one-half times as much water as fiber for the 50% resin content. The mixture is dried.

The fiber resin masses are advanced in an oven at 100° C. for 5 minutes in one case and 10 minutes in another for each of the fiber resin mixtures. The products are then molded at 150° C., at 3000 lbs. per sq. inch pressure, for 9 minutes, giving the results shown in Table I below.

Case A involves use of the resin as commercially obtained. Case B involves advancing the resin for 20 minutes at 100° C. prior to mixing with the fibers.

*Table I*

| Case | Resin Content | Minutes Advanced at 100° C. | Modulus of Impact | Modulus of Rupture |
| --- | --- | --- | --- | --- |
| | Per Cent | | gm. meter/sq. cm. | lbs./sq. in. |
| A | 10 | 0 | 47,030 | 5,540 |
| | 10 | 5 | 49,990 | 9,660 |
| | 10 | 10 | 32,160 | 5,740 |
| | 50 | 0 | 66,200 | 16,250 |
| | 50 | 5 | 59,400 | 14,300 |
| | 50 | 10 | 65,400 | 14,500 |
| B | 10 | 0 | 61,310 | 11,690 |
| | 10 | 5 | 48,200 | 9,720 |
| | 50 | 0 | 63,700 | 12,900 |
| | 50 | 5 | 61,300 | 18,700 |

EXAMPLE 4

Peeled aspen wood chips are defibered at about 350° F. in steam in about one minute in the presence of added water solution of phenol aldehyde resin having 80.6% resin solids. The resin and wood are fed into the machine at a controlled rate to produce in one instance a mass of fiber-resin having 30% resin and in another instance 50% resin. The resulting product is a feltable molding composition, in which the reactive resin is advanced. By determining acetone soluble and insoluble content, and considering the acetone insoluble as "advanced," it is found that for the 30% resin composition, 40% of the resin present is advanced, and for the other case, 50% of the resin used is advanced.

EXAMPLE 5

The fiber-resin composition of Example 4 is air dried and then molded at 150° C., 3000 lbs. per sq. in. pressure for 9 minutes. The properties are given below in Table II.

Table II

| Resin Content | Density | Modulus of Impact | Modulus of Rupture |
|---|---|---|---|
| | lbs./cu. ft. | gm. meter/sq. cm. | lbs./sq. in. |
| 30 | 84.6 | 56,540 | 17,750 |
| 30 | 66.3 | 29,000 | 10,600 |
| 30 | 48.8 | 14,300 | 7,970 |
| 50 | 83.6 | 31,270 | 19,300 |
| 50 | 67.8 | 29,000 | 6,540 |
| 50 | 49.8 | 14,500 | 2,980 |

EXAMPLE 6

Peeled aspen wood is defibered at about 350° F. in steam in about one minute, and a coarse fraction of the resulting fiber isolated. Using a water-soluble phenol-aldehyde resin in aqueous solution of 55.5% resin solids, approximately equal parts of resin solids and of the fiber fraction are mixed mechanically. The moisture content is allowed to drop to 20% of the total material by drying. Shaped preforms are made under 600 lbs. per sq. in. pressure. The preform has a density of 35 lbs. per cu. ft. and is held together by the resulting felting. The preform is transferred to a mold. The preform is molded at 150° C., at 80 lbs. per sq. in. pressure, for 5 minutes to 9 minutes.

EXAMPLE 7

Peeled aspen is defibered at about 350° F. in steam in about one minute in the presence of a liquid phenol aldehyde resin, providing a fiber-resin mass of 50% fiber and 50% resin solids, of which about half the resin is acetone insoluble. The resin is partially advanced and seals the fibers. The fibers are suspended in water and felted to a mat, which when dry weighs 11.9 lbs. per cu. ft. Blanks to fit a mold are cut from the mat. The blanks are molded at 150° C. for 9 minutes at 3000 lbs. per sq. in. pressure.

Another sample of the fiber is preformed without water and similarly molded.

The properties compare in Table III as follows:

Table III

| Preform | Density | Modulus of Impact | Modulus of Rupture |
|---|---|---|---|
| | lbs./cu. ft. | gm. meter/sq. cm. | lbs./sq. in. |
| Hydraulic | 84.3 | 61,000 | 11,500 |
| Dry-Pressure | 83.5 | 35,000 | 13,600 |

The resin is advanced in the process of defibering. This advancement not only seals the fibers against easy loss of water-soluble content, but it localizes the resin into the fiber, preventing the flow of it to the extent that unadvanced resin will flow in the molding.

EXAMPLE 8

Using a phenol aldehyde resin in water solution at 57.4% resin solids, in the presence of aspen being defibered at about 350° F. in steam in about one minute, various resin fiber compositions are made. In these the acetone-soluble resin is determined as a measure of the advancing of the resin. The fiber-resin masses are converted to preforms by hydraulic felting and by dry felting. The preforms are molded at 3000 lbs. per sq. in. pressure and 150° C. for 9 minutes. Results are shown in Table IV.

Table IV

| Per Cent Fiber | Per Cent Resin | Per Cent of Resin Acetone Soluble | Preforming Method | Density of Molded Articles | Mod. of Impact | Mod. of Rupture |
|---|---|---|---|---|---|---|
| | | | | lbs./cu. ft. | gm. meter/sq. cm. | lbs./sq. in. |
| 100 | 0 | [1] 3.9 | | | | |
| 70 | 30 | 14.7 | Dry | 83.7 | 56,500 | 17,350 |
| 50 | 50 | 22.2 | do | 84.0 | 43,800 | 11,550 |
| 50 | 50 | 22.2 | Hydraulic | 81.1 | 62,400 | 16,400 |

[1] Represents a blank for acetone-soluble material of fiber.

EXAMPLE 9

Aspen wood is defibered in steam at about 350° F. in about one minute in the presence of a 40% emulsion in water of glycerol-phthalate resin (Aquaplex A 90 made by Resinous Products Chemical Company, Inc. of Philadelphia), providing moist fibers carrying the resin.

In case A, 4 parts resin solids per 100 parts of wood are used. In case B, 8 parts of resin solids per 100 parts of wood are used.

In both cases the moist fiber is formed into a felted mass to fit a mold and hot pressed at about 150 to 160° C., at 215 lbs. per sq. in. pressure, for 20 minutes to make dense board-like products as given below in Table V.

EXAMPLE 10

In place of aspen in Example 9 jackpine wood is used and defibered at about 365° F. The products have densities as given below in Table V.

Table V

| Kind of Wood | Amount of Resin Solids, Per Cent Based on Fiber | Density of Molded Product, lbs./cu. ft. |
|---|---|---|
| Aspen | 4 | 71.4 |
| Do | 8 | 64.9 |
| Jackpine | 4 | 69.3 |
| Do | 8 | 63.0 |

EXAMPLE 11

Aspen wood is defibered in steam at a temperature of 353° F., in about one minute, in the presence of 5% (case A) and 26% (case B) resin solids used as a 50% water solution of phenol-formaldehyde resin. "Cured" resin is determined as the acetone insoluble portion. In case A, 95% of the resin is cured. In case B, 54.4% of the resin is cured. The fibers of case A may then be associated with additional resin. The fibers of case B are suitable molding fibers, and may be readily felted by hydraulic methods, the resin serving to seal fibers against loss of water solubles. The final cured resin effects bonding in molding.

FELTING TO PREFORMS

The felting of the fibers to felted bodies using a water-suspension of the fiber is not intended in the present invention to be suitable for the fibers which have not been sealed by resin against loss of water-solubles, and for fibers having water-soluble resin. Hydraulic felting also requires drying, and where heat is employed, this may advance the resin too far for certain types of products.

In the case of forming blankets by deposition from air suspensions, as in gravity depositions of mats, the use of water in moistening quantity is desired to secure a suitable formation of felt, at least to the extent that the mat is wet or quite moist. Use of heat to remove waer may advance the resin too far for certain uses. Also the density of a blanket so formed is not high, and binder, such as the resin employed, holds the mat or blanket together.

The avoidance of such water requiring drying, and the securing of denser felting than in blanket formation, may be readily and quickly obtained by impact deposition, or pneumatic conveyance in gas to deposit high velocity fibers onto already deposited fibers, as set forth in said application of C. C. Heritage, Serial No. 294,212, filed September 9, 1939. Fibers may be felted into spaces of angular and other complex form as well as into plane-panel form. A density of the order of 4 to 7 pounds of fiber-resin per cu. ft. may be obtained, with excellent felting of the fibers, and with excellent uniformity of density.

Such pneumatically felted bodies are suitable preforms for insertion into thermal-pressure molds for setting the resin. Also, they may be further compacted by pressure of low or high degree, to make them more rigid, denser, or handleable, or transportable.

Such pneumatic felting process is particularly adaptable to the commercial production of thin fiber-resin panel board. The thermal-setting molds require separate panels, rather than a continuous stretch of material. Presses employing several panels are in common use. Time in the press is of the order of 5 to 20 minutes. Pneumatic felting of such individual panels may be effected in about one minute per panel and any subsequent simple pressing is not limited by any essential time factor, other than mechanical operation of the equipment. Thus, one pneumatic felting unit and one pressing unit may be used to supply one multiple hot press. Such a process of forming hard felted wood-fiber panels is far superior to the water-felting and drying equipment now in common use to make hard panel board.

As an example of conditions for the above operation, a feltable aspen wood fiber-resin mass with 50% resin (dry basis) produced as above described, and having an appreciable moisture content, such as 25% to 50%, is pneumatically blown into a panel space, for example 4 ft. x 4 ft., giving a felted mat of 5.3 to 5.7 pounds (dry basis) per cu. ft. Greater pressure in blowing may effect a higher density such as 7.4 pounds per cu. ft. (dry basis). Such a panel is then molded in a press at a temperature, such as 250° F. to 300° F., and under pressure, such as 1500 to 1620 lbs. per sq. inch for a suitable time, such as 10 to 20 minutes. A board about ⅛ inch thick at a density of 80 to 85 lbs. per cu. ft. is thus obtained.

The present application is a division of my earlier application Serial No. 456,559, filed August 28, 1942, which latter is a continuation in part of my earlier application Serial No. 227,338, filed August 29, 1938, both of which applications are now abandoned.

The above examples are illustrative of the variations permitted in carrying out the invention in a practical manner, and are not to be considered as limiting the invention short of its scope as comprehended by the appended claims.

I claim:

1. A hot-moldable composition of feltable fibers comprising essentially and in substantially uniform distribution, feltable fiber-forms of mechanically defibered wood containing substantially all the content of the wood from which the fibers are derived including all the cellulose as cellulose and including water-soluble forms of lignin and polysaccharides which forms are products of reaction in the wood of natural water-insoluble constituents of the wood in an environment of steam at temperatures above 212° F. and at which lignin in the wood is softened, and from 4 parts to about 150 parts by weight of resinous solids per 100 parts of dry fiber, said solids being adhesively united to the fibers, some of said solids being substantially thermoset resin solids as a sealing resin coat on said fibers as individual fibers, and the remainder of said solids being heat-softenable and thermosetting resin-forming solids present in an amount by weight from about 4 parts per 100 parts of dry fiber, said composition being characterized by the ability of the fibers to move one relative to the others at a softening heat for said solids, whereby to facilitate movement of fibers in a hot-molding operation.

2. A hot-moldable composition of feltable fibers comprising essentially and in substantially uniform distribution, feltable fiber-forms of mechanically defibered wood containing substantially all the content of the wood from which the fibers are derived including all the cellulose as cellulose and including water-soluble forms of lignin and polysaccharides which forms are products of reaction in the wood of natural water-insoluble constituents of the wood in an environment of steam at temperatures above 212° F. and at which lignin in the wood is softened, and upwardly from 4 parts to about 150 parts by weight of resinous solids of phenol-aldehyde condensation products per 100 parts of dry fiber, said solids being adhesively united to the fibers, some of said solids being substantially thermoset as a sealing resin coat on said fibers as individual fibers, and the remainder of said solids being heat-softenable and thermosetting resin-forming solids present in amount by weight upwardly from about 4 parts per 100 parts of dry fiber, said composition being characterized by the ability of the fibers to move one relative to the others at a softening heat for said solids, whereby to facilitate movement of fibers in a hot-molding operation.

3. A moldable preform consisting of the feltable fibers of claim 1 felted together into a mat having a density of from 4 to 7.4 pounds per cu. ft., the fibers of said mat being movable each with respect to the others for movement in a mold when the resinous solids content thereof is softened under the influence of heat in a hot-molding operation.

4. A moldable preform consisting of the feltable fibers of claim 2 felted together into a mat having a density of from 4 to 7.4 pounds per cu. ft., the fibers of said mat being movable each with respect to the others for movement in a mold when the resinous solids content thereof is softened under the influence of heat in a hot-molding operation.

CLARK C. HERITAGE.

REFERENCES CITED

The following references are of record in the file of this patent:

UNITED STATES PATENTS

| Number | Name | Date |
|---|---|---|
| 1,031,505 | Andrews | July 2, 1912 |
| 1,217,181 | Illingworth | Feb. 27, 1917 |
| 1,220,292 | Tucker | Mar. 27, 1917 |
| 1,223,216 | Talley | Apr. 17, 1917 |
| 1,336,403 | Weiss | Apr. 6, 1920 |
| 1,461,337 | Weiss | July 10, 1923 |
| 1,578,481 | Stryker | Mar. 10, 1926 |
| 1,683,881 | Fischer | Sept. 11, 1928 |
| 1,771,150 | Stevenson | July 22, 1930 |
| 1,886,269 | Chamberlain | Nov. 1, 1932 |
| 1,914,163 | Randall | June 13, 1933 |
| 1,949,249 | Fisher | Feb. 27, 1934 |
| 1,979,012 | Reilly | Oct. 30, 1934 |
| 1,996,757 | Erkner | Apr. 9, 1935 |
| 2,008,892 | Asplund | July 23, 1935 |
| 2,047,170 | Asplund | July 13, 1936 |
| 2,067,012 | Loetscher | Jan. 5, 1937 |
| 2,072,686 | Robinson | Mar. 2, 1937 |
| 2,249,888 | Dodge | July 22, 1941 |
| 2,402,160 | Heritage | June 18, 1946 |
| 2,439,601 | Heritage | Apr. 13, 1948 |
| 2,439,602 | Heritage | Apr. 13, 1948 |
| 2,439,603 | Heritage | Apr. 13, 1948 |
| 2,439,604 | Heritage | Apr. 13, 1948 |
| 2,454,532 | Walter | Nov. 23, 1948 |

FOREIGN PATENTS

| Number | Country | Date |
|---|---|---|
| 12,149 of 1933 | Australia | Apr. 19, 1934 |
| 635,205 | Germany | Sept. 12, 1936 |

OTHER REFERENCES

Paper Trade Journal, May 2, 1940, page 36.

The Influence of Defibration on the Properties of Wallboard by W. Holst, Reprint from Third International Conference for Timber Utilization, Paris, July 26 to 28, 1937 (3 pages).